United States Patent
Huang (10) Patent No.: US 11,249,450 B1
(45) Date of Patent: Feb. 15, 2022

(54) CALIBRATION OF MULTI-STAGE SERVO SYSTEM

(71) Applicant: Seagate Technology LLC, Fremont, CA (US)

(72) Inventor: XingHui Huang, Longmont, CO (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 17/039,014

(22) Filed: Sep. 30, 2020

(51) Int. Cl.
*G05B 19/042* (2006.01)

(52) U.S. Cl.
CPC .. *G05B 19/042* (2013.01); *G05B 2219/21064* (2013.01)

(58) Field of Classification Search
CPC .................................................. G05B 19/042
USPC ........................................................... 700/28
See application file for complete search history.

(56) References Cited

U.S. PATENT DOCUMENTS

| | | | |
|---|---|---|---|
| 6,697,211 B2 | 2/2004 | Koganezawa | |
| 6,847,504 B1 | 1/2005 | Bennett et al. | |
| 6,852,322 B2 | 2/2005 | Nascimento et al. | |
| 7,136,257 B2 * | 11/2006 | Zhang | G11B 5/59622 360/78.05 |
| 7,215,499 B1 | 5/2007 | Li et al. | |
| 7,280,319 B1 | 10/2007 | McNab | |
| 7,283,321 B1 | 10/2007 | Sun et al. | |
| 7,466,520 B2 | 12/2008 | White et al. | |
| 7,532,440 B2 | 5/2009 | Williams et al. | |
| 8,144,419 B1 | 3/2012 | Liu | |
| 8,254,222 B1 | 8/2012 | Tang | |
| 8,780,489 B1 * | 7/2014 | Gayaka | G11B 5/59627 360/78.05 |
| 9,601,143 B1 | 3/2017 | Seo et al. | |
| 9,911,442 B1 * | 3/2018 | Kharisov | G11B 5/5552 |
| 10,418,055 B1 | 9/2019 | Yeom et al. | |
| 10,593,358 B2 | 3/2020 | Kraus et al. | |
| 10,783,910 B2 | 9/2020 | Zhu et al. | |
| 2001/0050833 A1 | 12/2001 | Murphy et al. | |
| 2002/0176201 A1 | 11/2002 | Hsin et al. | |
| 2004/0080861 A1 | 4/2004 | Bonin et al. | |

(Continued)

OTHER PUBLICATIONS

Chunling Du; Three-Stage Control for High Servo Bandwidth and Small Skew Actuation; https://www.researchgate.net/publication/272428429_Three-Stage_Control_for_High_Servo_Bandwidth_and_Small_Skew_Actuation; Jan. 2015; 8 pages.

(Continued)

*Primary Examiner* — Mohammad Ali
*Assistant Examiner* — Joshua T Sanders
(74) *Attorney, Agent, or Firm* — Kirk A. Cesari; Christian W. Best (57) ABSTRACT

Systems and methods are disclosed for calibrating actuators in a multi-stage servo system. In certain embodiments, a method may comprise performing a calibration process on a multi-stage actuated servo system, including: seeking the multi-stage actuated servo system to a selected location, via a first stage actuator; providing a first voltage injection to a first microactuator of the multi-stage actuated servo system; measuring a first position error signal (PES) of the multi-stage actuated servo system; determining a first gain for the first microactuator based on the first PES, without adding a signal injection to the first PES; and applying the first gain to the first microactuator.

19 Claims, 6 Drawing Sheets

(56) References Cited

U.S. PATENT DOCUMENTS

2004/0228027 A1    11/2004   Zhang et al.
2013/0258520 A1    10/2013   Matsuzawa et al.

OTHER PUBLICATIONS

Multi Actuator Technology: A New Performance Breakthrough; https://blog.seagate.com/craftsman-ship/multi-actuator-technology-a-new-performance-breakthrough/; 2018; 7 pages.
Zeng, et al.; Nonlinear Tracking Control for a Hard Disk Drive Dual-Stage Actuator System; https://www.researchgate.net/publication/224333235_Nonlinear_Tracking_Control_for_a_Hard_Disk_Drive_Dual-Stage_Actuator_System; Nov. 2008; 8 pages.

* cited by examiner

CALIBRATION OF MULTI-STAGE SERVO SYSTEM

SUMMARY

In certain embodiments, a method may comprise performing a calibration process on a multi-stage actuated servo system, including: seeking the multi-stage actuated servo system to a selected location, via a first stage actuator; providing a first voltage injection to a first microactuator of the multi-stage actuated servo system; measuring a first position error signal (PES) of the multi-stage actuated servo system; determining a first gain for the first microactuator based on the first PES, without adding a signal injection to the first PES; and applying the first gain to the first microactuator.

In certain embodiments, an apparatus may comprise an actuator arm having a multi-stage actuated servo system, the actuator arm including a first actuator and a second actuator. The apparatus may further comprise a control circuit configured to perform a calibration process on the multi-stage actuated servo system, including: seek the actuator arm to a selected location, via a first stage actuator; provide a first voltage injection to the second actuator; measure a first position error signal (PES) of the actuator arm; determine a first gain for the second actuator based on the first PES, without adding a signal injection to the first PES; and apply the first gain to the second actuator.

In certain embodiments, a memory device may store instructions that, when executed, cause a processor to perform a method comprising executing a calibration process on a multi-stage actuated servo system, including: seeking the multi-stage actuated servo system to a selected location, via a first stage actuator; providing a first voltage injection to a first microactuator of the multi-stage actuated servo system; measuring a first position error signal (PES) of the multi-stage actuated servo system; determining a first gain for the first microactuator based on the first PES, without adding a position injection to the first PES; and applying the first gain to the first microactuator.

DETAILED DESCRIPTION

In the following detailed description of certain embodiments, reference is made to the accompanying drawings which form a part hereof, and in which are shown by way of illustration of example embodiments. It is also to be understood that features of the embodiments and examples herein can be combined, exchanged, or removed, other embodiments may be utilized or created, and structural changes may be made without departing from the scope of the present disclosure.

In accordance with various embodiments, the methods and functions described herein may be implemented as one or more software programs running on a computer processor or controller. Dedicated hardware implementations including, but not limited to, application specific integrated circuits, programmable logic arrays, and other hardware devices can likewise be constructed to implement the methods and functions described herein. Methods and functions may be performed by modules or nodes, which may include one or more physical components of a computing device (e.g., logic, circuits, processors, etc.) configured to perform a particular task or job, or may include instructions that, when executed, can cause a processor to perform a particular task or job, or any combination thereof. Further, the methods described herein may be implemented as a computer readable storage medium or memory device including instructions that, when executed, cause a processor to perform the methods.

Figure 1:
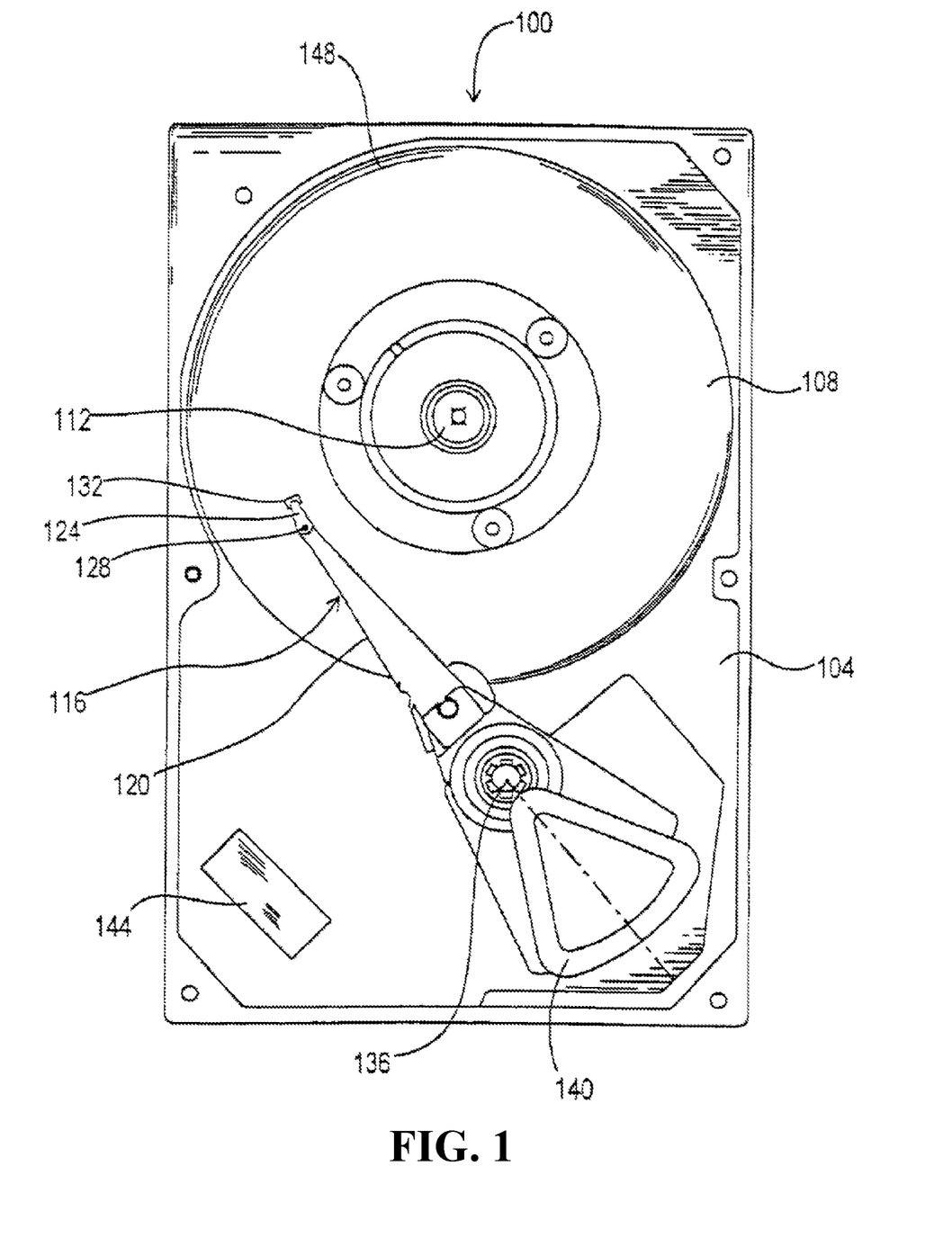
FIG. 1 is a diagram of a system configured for calibration of a multi-stage servo system, in accordance with certain embodiments of the present disclosure.

FIG. 1 is a diagram of a system 100 configured for calibration of a multi-stage servo system, in accordance with certain embodiments of the present disclosure. A multi-stage servo system may refer to a system employing servomechanisms to change positioning of an element using a plurality of actuators, with each actuator of the element comprising a "stage" of the multi-stage system. In the depicted example of FIG. 1, the system 100 may include a data storage device (DSD) 100, such as a storage drive or any other device that may be used to store or retrieve data, including a hard disc drive (HDD) or hybrid drive. As used herein, a data storage drive may refer to a device specifically adapted for data storage and retrieval to a memory internal to the drive, not including more general purpose processing devices such as computers and smart devices, although the DSD 104 and the teachings herein are not limited to such drives.

The DSD 100 may include a base or housing 104, into which one or more disc storage mediums 108 may be installed (e.g. the DSD 100 may include a "stack" of a plurality of vertically aligned discs 108). The disc 108 may include a magnetic storage disc, an optical disc, or any other disc data storage medium. Data may be stored to the disc 108 on a plurality of concentric or spiral data tracks or cylinders 148 on the surface of the disc 108. Data may be written to or read from the disc 108 while the disc 108 spins around a central shaft 112 rotated via a spindle motor.

Data may be written to or retrieved from the disc 108 via one or more heads 132 (e.g. magnetic transducer read or write heads) mounted to an actuator arm assembly 116. The actuator arm assembly 116 may include a first actuator 140 (e.g. a voice coil motor, VCM) which controls a first, coarse actuation of the arm assembly 116 by pivoting the arm assembly 116 on a pivot shaft or bearing 136. As the actuator arm assembly 116 pivots on the pivot shaft 136, the head 132 can be positioned over any part of the radius of the disc 108 between an inner diameter near the spindle 112 and an outer diameter.

The actuator arm assembly 116 may include a main arm portion 120 affixed to the first actuator 140 section at a first end, and supporting a suspension or flexure element 124 on the opposite end, at point 128. At the opposite end of the suspension 124 from the main arm portion 120 may be affixed a head gimbal assembly (HGA) including the head 132 and an air bearing surface allowing the head 132 to glide over the surface of the disc 108 on a thin air bearing layer as the disc 108 rotates. The suspension 124 and head 132 may together be referred to as a head suspension assembly (HSA).

During data access operations to the disc 108, the head 132 can be positioned over a selected location (e.g. a desired track 148) by moving the head 132 using one or more actuators on the actuator arm 116. The individual data tracks 148 may be extremely narrow, and accordingly the head 132 may need to be precisely positioned over a desired track before data access operations can be performed. When the head 132 is moved to a new track (a process called a "seek" operation), minute positional corrections may need to be performed until the head has settled over the target track. In a single stage servo system, the position of the head 132 may be controlled entirely be a single coarse actuator, such as VCM 140. The VCM 140 may be able to quickly make large adjustments to the positioning of the actuator arm 116, but may require a long time or many adjustments to settle the head 132 over a target track.

Accordingly, additional actuators may be added to the actuator arm 116, to make smaller, more precise adjustments to the position of the head 132, and thereby accelerate the settling process. These additional actuators may be referred to as microactuators, and in some embodiments may comprise piezoelectric actuators (sometimes referred to as "PZT" herein, based on the lead-zirconate-titanate material often used in piezoelectric devices). For example, a first microactuator may be positioned at point 128, between the main arm element 120 and the suspension 124, allowing the first microactuator to adjust a position of the HSA. A servo system with a VCM 140 and a first microactuator 128 may be a two-stage servo system. In some embodiments, additional microactuators may be added. For example, a second microactuator may be collocated at the head 132, e.g. between the suspension 124 and the head 132, and configured to adjust a position of just the head 132. A servo system with a VCM 140 and two microactuators may be referred to as a tri-stage actuated servo system. A multi-stage servo system may include any number of actuators positioned on an actuator arm 116. The further down the actuator arm 116 from the pivot shaft 136 an actuator is positioned, it may be configured to make smaller but more precise positional adjustments to the head 132.

Microactuators may need to be calibrated in gain, in order to provide predictable and reliable performance. Microactuator calibration may be performed during operation of the DSD 100, and a calibration process that is fast and reliable can improve drive performance. Accordingly, the DSD 100 may include controllers, processor, circuits, firmware, or other modules 144 for controlling operations of the DSD 100, for performing a calibration operation for microactuators of the multi-stage servo system. The control systems 144 may also control positioning of the head 132 via the multi-stage servo system to perform data access operations to the disc 108, for example in response to commands received from a host device, or for internal data management operations initiated at the DSD 100 itself. A more detailed diagram of the DSD 100 is discussed in regard to FIG. 2.

Figure 2:
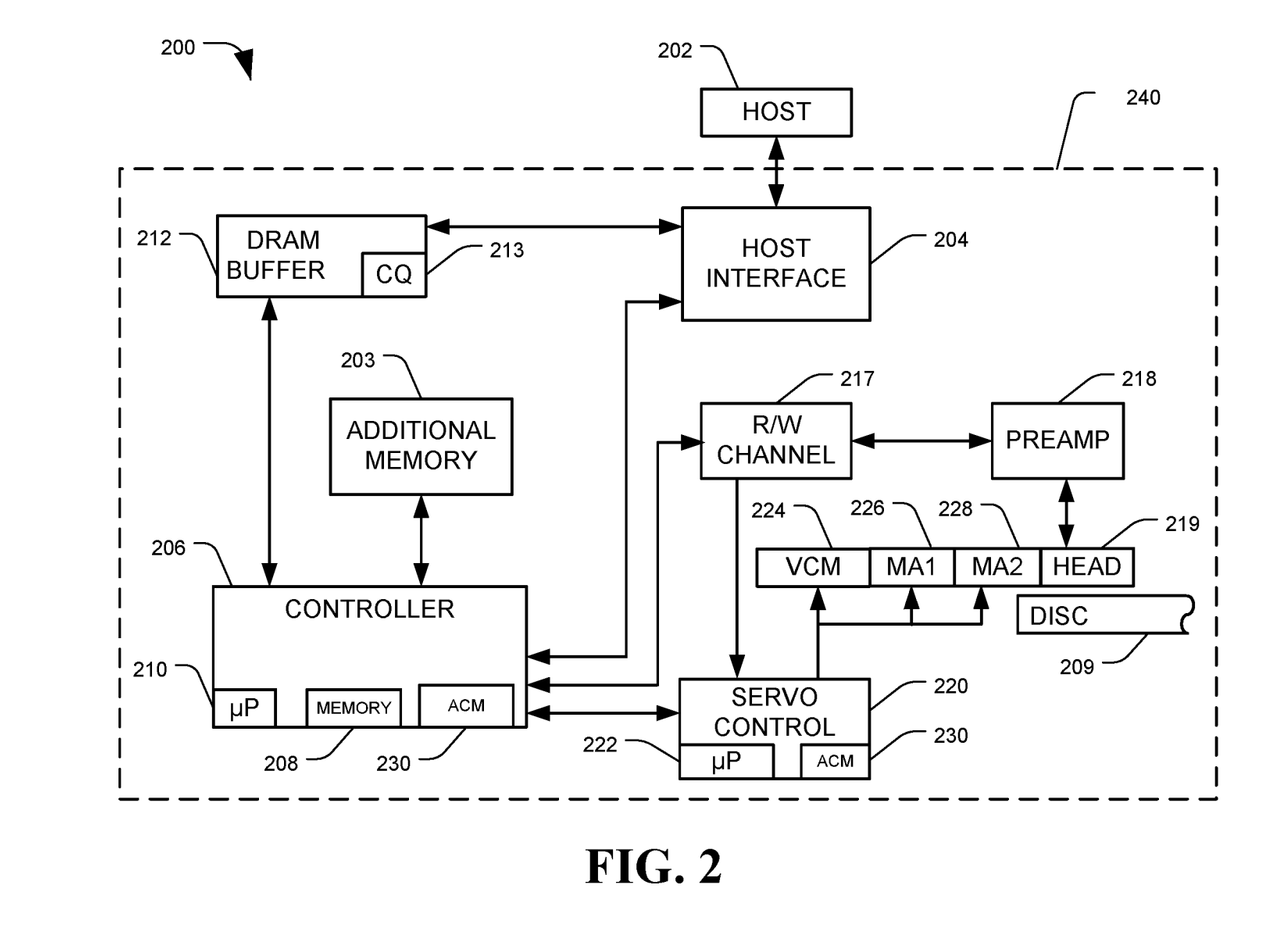
FIG. 2 is a diagram of a system configured for calibration of a multi-stage servo system, in accordance with certain embodiments of the present disclosure.

FIG. 2 is a diagram of a system, generally designated 200, configured for calibration of a multi-stage servo system, in accordance with certain embodiments of the present disclosure. Specifically, FIG. 2 provides a functional block diagram of an example data storage device (DSD) 200, which may be an example of the DSD 100 of FIG. 1. The DSD 200 may also be referred to as hard disc drive (HDD) 200, according to some embodiments. The DSD 200 can communicate with a host device 202 via a hardware or firmware-based interface circuit 204. The interface 204 may comprise any interface that allows communication between a host 202 and a DSD 200, either wired or wireless, such as USB (universal serial bus), IEEE (Institute of Electrical and Electronics Engineers standard) 1394, Compact Flash, SATA (Serial AT Attachment), eSATA (External SATA), PATA (Parallel AT Attachment), SCSI (Small Computer System Interface), SAS (Serial Attached SCSI), PCIe (Peripheral Component Interconnect Express), Fibre Channel, Ethernet, or Thunderbolt, among others. The interface 204 may include a connector that allows the DSD 200 to be physically removed from the host 202. The DSD 200 may have a casing 240 housing the components of the DSD 200.

The buffer 212 can temporarily store data during read and write operations, and can include a command queue (CQ) 213 where multiple operations can be temporarily stored pending execution. Commands arriving over the interface 204 may automatically be received in the CQ 213 or may be stored there by controller 206, interface 204, or another component.

The DSD 200 can include a programmable controller 206, which can include associated memory 208 and processor 210. The controller may execute firmware (FW) (e.g. instructions stored to a memory, such as additional memory 203) to control the operations of the DSD 200. The controller 206 may control data access operations, such as reads and writes, to one or more memories, such as disc memory 209, additional memory 203, or any combination thereof. For example, additional memory 203 may include volatile memory such as dynamic random access memory (DRAM) or static RAM (SRAM), nonvolatile solid state memory such as NAND flash memory, read-only memory (ROM), or other memory types. The additional memory 203 can function as a working memory for storing temporary data, a cache to store recently or frequently read or written data, or data likely to be read soon, or for other temporary data storage. Additional memory 203 may also function as main long-term storage instead of or in addition to disc(s) 209. A DSD 200 containing multiple types of nonvolatile storage mediums, such as a disc(s) and flash, may be referred to as a hybrid storage device. The memory 208 may similarly include DRAM, SRAM, or similar volatile memory, and may store FW instructions during device operation, cached data, or other information.

The DSD 200 can include a read-write (R/W) channel 217, which can encode data during write operations and reconstruct user data retrieved from a memory, such as disc(s) 209, during read operations. A preamplifier circuit (preamp) 218 can apply write currents to the head(s) 219 and provides pre-amplification of read-back signals. Head(s) 219 may include a read head element and a write head element. A servo control circuit 220 may use servo data to provide the appropriate current to the actuator 224, sometimes called a voice coil motor (VCM), to position the head(s) 219 over a desired area of the disc(s) 209 by moving an adjustable arm on which the head(s) 219 are mounted. The servo control 220 may also control movement of additional actuators on an actuator arm, such as a first microactuator (MA1) 226 and a second microactuator (MA2) 228. The controller 206 can communicate with a processor 222 of the servo control circuit 220 to move the head(s) 219 to the desired locations on the disc(s) 209 during execution of various pending commands in the command queue 213.

The DSD 200 may include an actuator calibration module (ACM) 230. The ACM 230 may be a processor, controller, or other circuit, or it may be a set of software instructions that, when executed by a processing device, perform the functions of the ACM 230. In some embodiments, the ACM 230 may be part of or executed by the controller 206, part of the servo controller 220, incorporated into other elements of the DSD 200, a standalone component within the DSD 200, or any combination thereof. The ACM 230 may control operations of DSD 200 relating to performing calibration operations on one or more actuators of a multi-stage actuated servo system, as described herein. An example of a multi-stage actuator arm is provided in more detail in FIG. 3.

Figure 3:
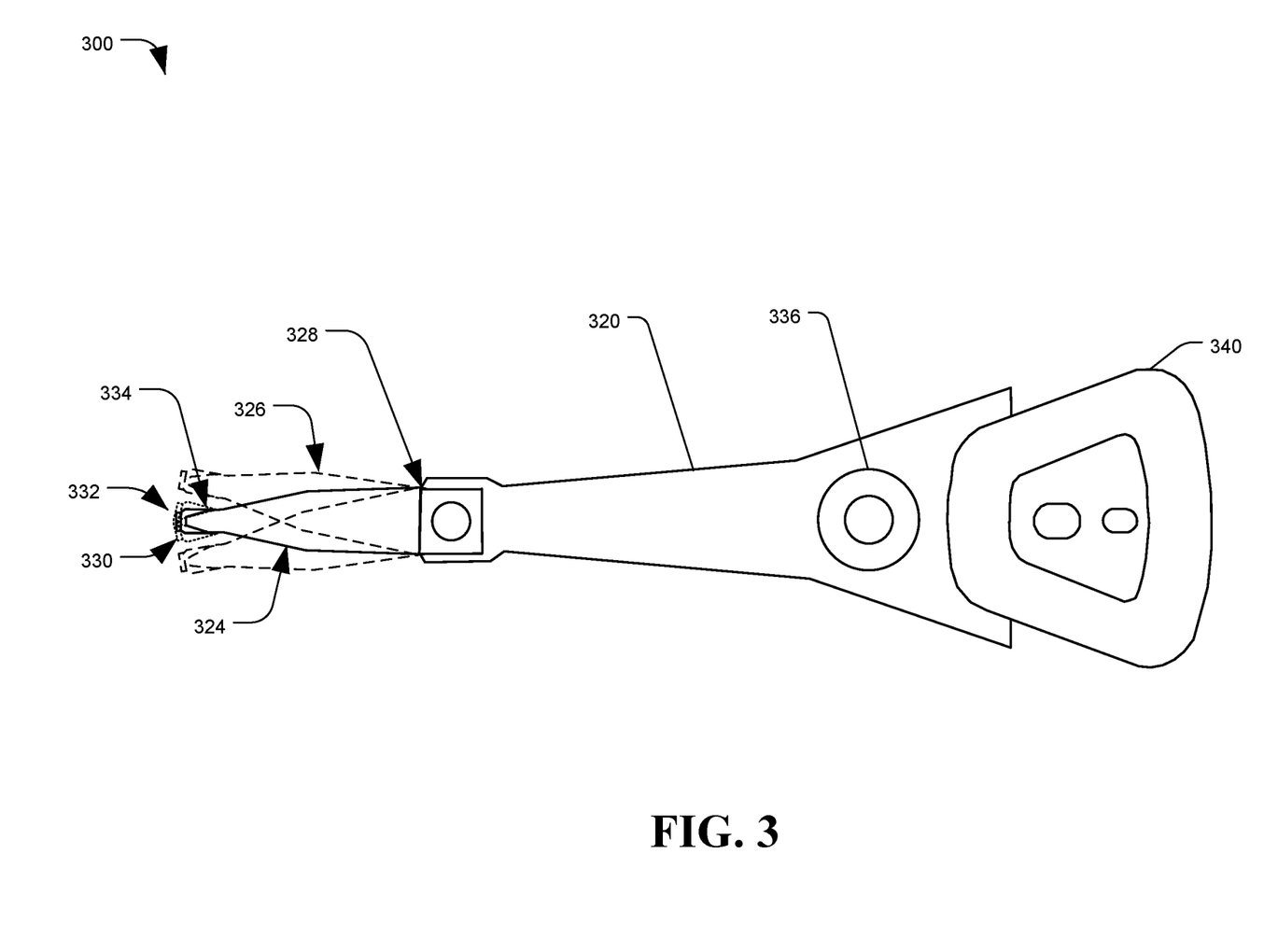
FIG. 3 is a diagram of a system configured for calibration of a multi-stage servo system, in accordance with certain embodiments of the present disclosure.

FIG. 3 is a diagram of a system, generally designated 300, configured for calibration of a multi-stage servo system, in accordance with certain embodiments of the present disclosure. Specifically, FIG. 3 provides a diagram of an example actuator arm 300 for a disc storage media, which may be an example of actuator arm assembly 116 of FIG. 1.

The actuator arm assembly 300 may include a first actuator 340, a pivot shaft or bearing 336, and a main arm portion 320. The first actuator 340 may include a coarse actuator, such as a voice coil motor (VCM), for controlling fast, large-stroke movements of the actuator arm assembly 300. The first actuator 340 may control the actuator arm assembly 300 to pivot on the pivot shaft 336 in order to adjust a position of the head 332.

At the distal end of the main arm portion 320 may be affixed a suspension or flexure element 324, which may support a head gimbal assembly (HGA) including a head element 332 (e.g. one or more magnetic transducer heads, such as a read head and a write head). The combined suspension and HGA 332 may be referred to as a head suspension assembly (HSA).

The actuator arm assembly 300 may include one or more actuators in addition to the first actuator 340, such as PZT microactuators (sometimes referred to as simply microactuators or PZTs). In the depicted embodiment, a first PZT microactuator 328 may be located between the main arm element 320 and the suspension 324. The first PZT 328 may adjust a positioning of the head 332 by moving the HSA over a limited stroke, as indicated by dashed lines 326.

A second PZT microactuator 334 may be co-located with head 332, positioned between the suspension 324 and the head 332. The second PZT 334 may adjust a positioning of the head 332 by directly moving the head 332 over a limited stroke, as indicated by dashed lines 330. The first PZT 328 may have a larger skew or stroke, but lower bandwidth than the second PZT 334. As used herein, Bandwidth may refer to a capability of an actuator in regard to what frequency an actuator can work to respond to disturbances, or to drive the tracking error (PES) toward zero.

Together, the first actuator 340, first microactuator 328, and second microactuator 334 may comprise a tri-stage servo system, and may allow rapid seeking and settling to a selected location (e.g. a target data track). For example, the first actuator 340 may rapidly seek across a surface of a disc memory (e.g. a macro adjustment of the head 332 position), but may slightly overshoot the target track. Microactuators 328 and 334 may provide micro adjustments to the head 332 position to compensate for any overshoot (or undershoot) from the first actuator 340. If the first actuator 340 over- or undershoots the target track, it may be minutely adjusted until the head 332 is positioned over the target track without adjustments from the microactuators 328 and 334. That is, as the positioning of the first actuator 340 is corrected, the microactuators 328 and 334 may correspondingly adjust back to a default (e.g. straight) alignment. Further, even after settling on a track and performing track following, the head may need to undergo minute adjustments to re-center over a track, e.g. due to repeatable and non-repeated run out errors. The microactuators 328 and 334 may be better suited to quickly make the minor head position adjustments than a coarse main actuator such as a VCM 340. Proper and efficient functioning of a multi-stage actuated servo system may require that the multi-stage system be properly calibrated. Control diagrams and a proposed gain-based calibration method for multi-stage servo systems is discussed in regard to the following figures.

Figure 4:
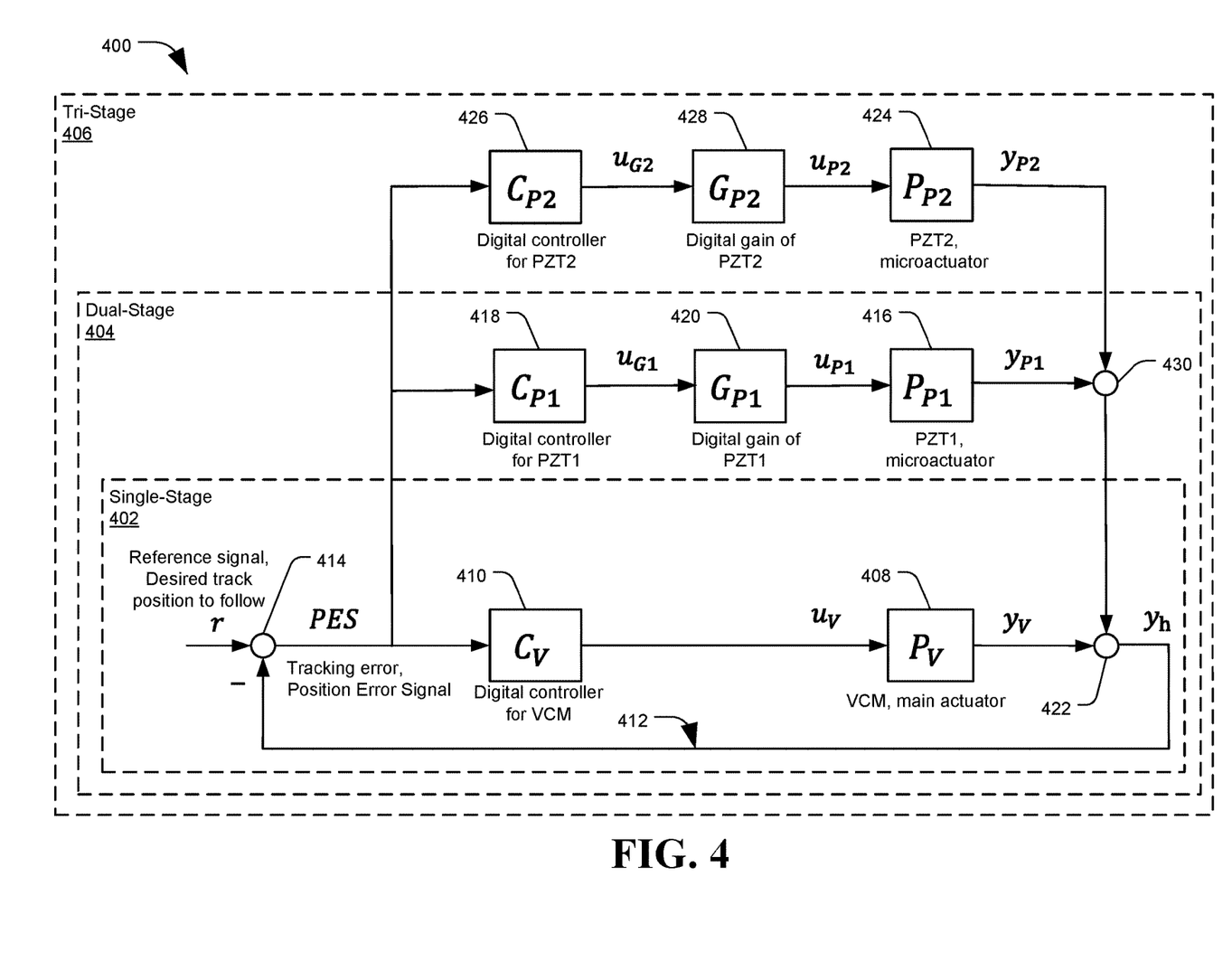
FIG. 4 is a diagram of a system configured for calibration of a multi-stage servo system, in accordance with certain embodiments of the present disclosure.

FIG. 4 is a diagram of a system, generally designated 400, configured for calibration of a multi-stage servo system, in accordance with certain embodiments of the present disclosure. The system 400 may be an example control loop for a tri-stage servo system.

The system 400 can be described on stage at a time. A single-stage drive servo system 402 may only include the coarse main or first actuator 408, $P_v$, described in this example as a voice coil motor (VCM) of a disc drive data storage device. A digital controller 410 for the VCM, $C_v$, may output a control signal $u_v$ as an input to the VCM 408. The single-stage system 402 may receive an input signal, r, representing a reference signal for a desired track to position to follow. Based on the reference signal r, the VCM controller 410 can generate control signal $u_v$ to control movement of the VCM 408. The VCM 408 may output a signal $y_v$, representing a head position based on the movement of the actuator arm by the VCM 408. In a single-stage system 402, the VCM 408 head position component $y_v$ may correspond directly to the actual or total head position signal $y_h$. The total head position signal $y_h$ may be fed back, via closed loop 412, and combined with reference signal r at combining circuit or node 414. The combining node 414 may generate a position error signal (PES) based on r and $y_h$, representing a deviation of the actual head position from the desired track position. The actual position of the head relative to the desired position may be determined by the system 400 based on servo control signals recorded to the surface of the disc medium in servo tracks or servo sectors. The PES may be provided to the VCM controller 410 and used to adjust the position of the VCM until the head settles over the desired track position and achieves servo lock (e.g. by driving the PES to approximately 0). The servo systems capability for tracking a desired signal (e.g. the data track center, represented by r) may be referred to as the "sensitivity" of the system. The single-stage sensitivity ($S_{SS}$) may be defined as:

$$S_{SS} = \frac{PES}{r} = 1/(1 + C_V P_V).$$

Adding a first microactuator element $P_{P1}$, PZT1 416, to the single stage servo system 402 may provide a dual-stage servo system 404. PZT1 416 may have a corresponding digital controller 418, $C_{P1}$, which may output a control signal $u_{G1}$ for a digital gain value for PZT1, $G_{P1}$ 420. Each actuator in a multi-stage actuated servo system may have its own dedicated controller, or they may all be controlled by one or more controllers that manage multiple actuators. Digital gain 420 may be a value of digital gain for normalizing the actual gain of the microactuator PZT1 416, and may be the value to be calibrated for PZT1 416 during the calibration process. $G_{P1}$ 416 may be a digital gain block representing the reciprocal of the gain $P_{P1}(f)$ at calibration frequency $f_0$; e.g. $G_{P1}=1/P_P(f_0)$. The gain value may be provided as a control input signal, $u_{P1}$, to control the gain at PZT1 416. The value of $P_{P1}$ may be the frequency response of the digital input $u_{P1}$ to the digital output PES. The range of the signals may depend on the actual configuration and the actuator and sensor resolution, but in an example may be +/−8192 for $u_{P1}$ and +/−4096 for PES.

In an example channel design, the output of the digital gain block 420 may be sent to a digital-to-analog converter (DAC) to produce an analog voltage signal, which may be passed through an amplifier, and then applied at the PZT 416 to control the microactuator to produce head motion. In some embodiments, $P_{P1}$ 416 may be considered to include a DAC, a voltage amplifier, and the PZT actuator itself. So for example, the digital controller 418 may output a digital gain control signal $u_{G1}$, which may be multiplied by the digital gain 420 to produce a digital output of +/−8192, which may be passed through a DAC to produce an analog voltage signal of +/−1V. The analog voltage signal may be amplified to +/−20 V, which amplified analog signal may be provided to the microactuator 416 as $u_{p1}$. PZT1 416 may then output a signal, $y_{p1}$, representing the head motion contribution from PZT1. The head position component from PZT1 416, $y_{p1}$ may be calculated as:

$$y_{p1}=P_{P1}*G_{P1}*C_{P1}*PES.$$

The system 400 may combine $y_{P1}$ with the head position component from the VCM 408, $y_v$, at combining circuit or adder 422, to produce the total head position signal $y_h$. The PES signal may be provided to both the VCM controller 410 and the PZT1 controller 418, and used to adjust the respective actuators.

The driving capability of a PZT microactuator, which may be represented by the gain ratio of $y_p/u_p$, may be affected by many factors, including temperature and time (e.g. the aging of components such as the microactuator). Therefore real-time gain calibration of $G_P$ may be used during drive operation in order to maintain a microactuator's nominal gain and behavior, and hence provide good performance of the overall servo system. The ratio of a microactuator's head position contribution to the gain control signal may be adjusted to maintain a desired nominal gain.

$$\frac{y_P}{u_G} = G_P P_P = P_{nominal} = \text{constant}$$

Adding a second microactuator element, PZT2 424, to the dual-stage servo system 404 may provide a tri-stage servo system 406. The functioning of the second microactuator 424 in the tri-stage system operates similarly to the second microactuator PZT1 416 of the dual-stage system. PZT2 424 may have a corresponding digital controller 426, $C_{P2}$, which may output a control signal $u_{G2}$ to control a digital gain for PZT2, $G_{P2}$ 428. The gain value may be provided as a control input signal, $u_{p2}$ to control the gain at PZT2 424. PZT2 424 may then output a signal, $y_{p2}$, representing the head motion contribution from PZT2. The head position component from PZT2 424, $y_{p2}$ may be calculated as:

$$y_{p2}=P_{P2}*G_{P2}*C_{P2}*PES.$$

The head position component from PZT2 424, $y_{p2}$, and the head position component from PZT1 416, $y_{P1}$, may be combined at the combining circuit or adder 430, and then combined with the head position component from the VCM 408, $y_v$, at combining circuit or adder 422, to produce the total head position signal $y_h$. The PES signal may be provided to each of the VCM controller 410, the PZT1 controller 418, and the PZT2 controller 426, and used to adjust the respective actuators.

Additional microactuators may also be added to the system 400 in a similar manner. In an example, PZT1 416 may be located between the main arm component and a suspension of an actuator arm (e.g. between a load bean and suspension). PZT2 424 may be located with the head of the actuator arm (e.g. between the suspension and head at the HGA). PZT1 416 may have more mechanical modes, and thus a limited bandwidth, relative to PZT2 424. Meanwhile, PZT2 424 may have a limited stroke compared to PZT1 416, but may be capable of a higher bandwidth due to a cleaner response in a wide frequency range. $G_{P1}$ 420 and $G_{P2}$ 428 may be digital gains for normalizing the corresponding microactuators, and their values may be determined by gain calibration as described herein.

Figure 5:
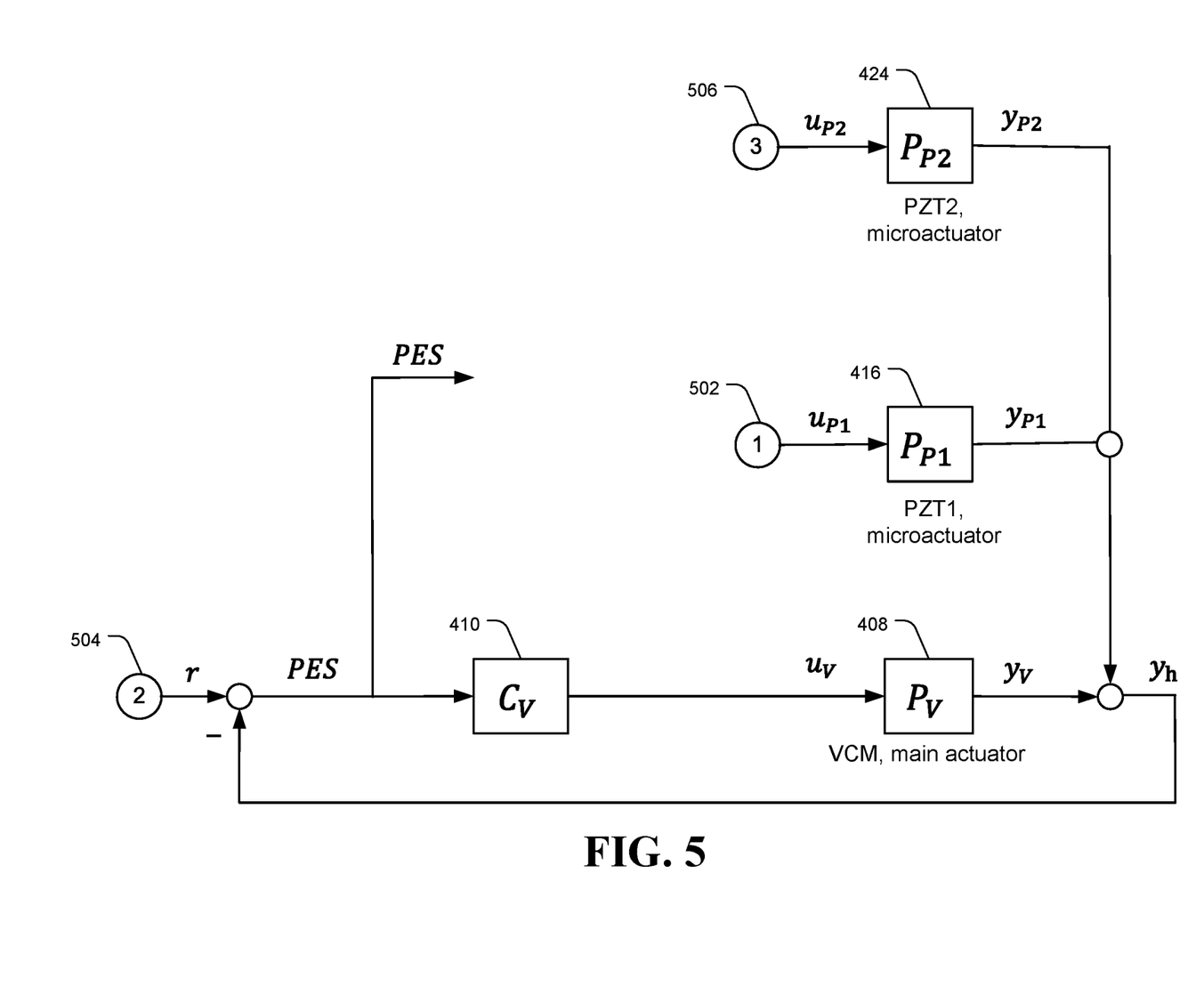
FIG. 5 is a diagram of a system configured for calibration of a multi-stage servo system, in accordance with certain embodiments of the present disclosure.

FIG. 5 is a diagram of a system, generally designated 500, configured for calibration of a multi-stage servo system, in accordance with certain embodiments of the present disclosure. The system 500 may be configured to perform a calibration operation in a control loop for a tri-stage servo system, such as the system depicted in FIG. 4. Components sharing the same labels in FIGS. 4 and 5 may correspond to the same type of components, and will not be described again for the sake of brevity.

Some calibration operations may use phase-based calibration, based on determining a phase of PES/r, and adjusting $G_P$ to drive the phase toward a predefined value, which may be the nominal phase of PES/r at a selected frequency $f_0$. However, this method may suffer from various variations and uncertainties, and the final calibrated gain may differ much from the actual gain in operation.

Another calibration method may include performing gain-based calibration for the PZT microactuators in a multi-stage actuated system (e.g. PZT1 416 and PZT2 424). Gain-based may mean that the calibration is based on a measurement of the gain ratio of $P_P=y_P/u_P$ at a selected calibration frequency (e.g. 3 kHz). The single-stage sensitivity gain at the calibration frequency may be represented as:

$$S_{SS} = \frac{PES}{r} = -\frac{PES}{y_P}$$

One potential gain calibration process to calibrate a servo system with a single PZT, such as PZT1 416, may be as follows:

Step 1: select a head or actuator arm to be calibrated, and seek to a selected location (e.g. seek to and follow a selected track) using single-stage servo control (e.g. using main actuator 408).

Step 2: perform a first injection 502 of a first sinusoidal signal $u_P$ at a selected frequency ($f_0$) to the PZT, and measure the PES: $PES(u_P)=u_P P_P S_{SS}$. PES may be generated based on both the head position $y_h$ (influenced by the first injection 502 to the PZT) and the reference head position based on servo info from the target track, r. However, during track following, preprocessing can result in a very small r value with a zero mean. Since the first injected signal $u_P$ 502 may include N cycles of a sinusoidal wave, by averaging, the effect of r or other noise may be largely eliminated, resulting in a PES based upon the $u_P$ injection.

Step 3: perform a second injection 504 of a second sinusoidal signal r to the closed loop and measure PES: $PES(r)=r.S_{SS}$. Here, $u_P$ may be set to 0, so that, after averaging for N cycles, the PES may be a factor of r without significant influence from $u_P$ or other noise. The second injection 504 may be a sinusoidal wave introduced to r in addition to the normal reference head information, such that after the injection, $r=r_{inj}+r_{trk}$, where $r_{inj}$ may be the injected sinusoidal wave and $r_{trk}$ may be the track center signal. As $r_{inj}$ may be much larger than $r_{trk}$ or $u_P$, averaging over the N cycles of the second injection 504 results in a PES that is a factor of the second injection rather than other signal information. As $r_{trk}$ may average to approximately 0, the second injection 504 of $r_{trk}$ may be referred to simply as r herein.

Step 4: The PZT gain at frequency $f_0$ (e.g. $P_P(f_0)$) may be represented as the gain ratio of the two PES signals: PES $(u_P)$/PES(r), so that:

$$P_P(f_0)=(u_P P_P S_{SS})/(r\ S_{SS})=\text{PES}(u_P)/\text{PES}(r).$$

$P_P(f)$ may be the frequency response over the whole frequency range, while $G_P=P_P(f_0)$ may be the gain of the PZT response $P_P(f)$ at frequency $f_0$. We may use $P_P(f_0)$ to represent the PZT gain, since at low frequency (say <10 kHz), $P_P(f)$ may be largely flat.

Step 5: With $G_P=P_{Pnominal}/P_P$, gain normalization may be realized by adjusting $G_P$ such that $G_P*P_P=P_{Pnominal}$.

Step 6: repeat steps 1-5 above for any additional heads or actuator arms to be calibrated.

In the provided example, both injection signals 1 ($u_P$) and 2 (r) may be a sinusoidal wave with a same frequency ($f_0$), magnitude, and length (N cycles). In this sense, the two injection signals 502 and 504 may be identical, such that $u_P=r$. The measured PES values, PES($u_P$) and PES(r), may also be sinusoidal waves at the same frequency and length. In this example calibration process, steps 2 and 3 may consume most of the calibration time (e.g. greater than 90% of the total calibration time).

The about 6-step process may be improved by running an injection sequence only once, which can reduce the calibration time while also improving calibration quality. In the proposed improved calibration process, the digital controller 410 for VCM 408 may be designed such that the gain of $S_{SS}(f_0)=1$ (=0 dB). This controller 410 and the resulting single-stage loop can be used for the gain calibration method of a single PZT (e.g. PZT1 416) proposed below:

Step 1: select a head or actuator arm to be calibrated, and seek to a selected location (e.g. seek to and follow a selected track) using single-stage servo control (e.g. using main actuator 408).

Step 2: Inject 502 a sinusoidal voltage signal $u_{P1}$ to the microactuator PZT1 416 and measure the resulting PES. The injection signal $u_{P1}$ 502 may be a sinusoidal wave at a selected frequency $f_0$ with a known magnitude (normalized to 1) and a fixed length (N cycles). The measured PES may also be a sinusoidal wave at the same frequency and length, and its magnitude may directly reflect the PZT 416 gain $P_{P1}$. Because of the above conditions, the PES of $u_{P1}$ maybe represented as:

$$\text{PES}(u_{P1})=u_{P1}P_{P1}S_{SS}=u_{P1}P_{P1}=P_{P1}$$

Step 3: Compare the magnitude of the measured PES ($=P_{P1}$) against a predefined value $P_{PN1}$, which represents the PES magnitude of the nominal PZT1 actuator 416, and the calibrated digital gain may be represented as $$G_{P1}=P_{PN1}/P_{P1},$$

by which gain normalization may be realized according to:

$$G_{P1}*P_{P1}=P_{PN1}.$$

Step 4: repeat steps 1-3 above for any additional heads or actuator arms to be calibrated.

Compared to the 6-step gain calibration process above, in the improved process the second injection 504 of position signal r and calculating the gain ratio, $P_P(f_0)=\text{PES}(u_P)/\text{PES}(r)$, are skipped. Therefore, in the improved gain calibration process, only one signal injection ($u_P$, the control input for the microactuator being calibrated) is used in the calibration of a microactuator, and a second injection may be avoided. This can not only save the calibration time by about half, but can also improve the calibration quality by reducing run-to-run variation in PES(r), since a head may not always follow a track precisely the same during any two disc revolutions.

Steps 2 and 3 of this improved calibration process can be repeated for systems including multiple microactuators to be calibrated. For example, after seeking to a desired location using a selected head in single-stage control for step 1, steps 2-3 may be performed first for $P_{P1}$ and $u_{P1}$, and then steps 2-3 may be repeated for $P_{P2}$ 424, with an injection 506 of signal $u_{P2}$, to calibrate the second microactuator PZT2 424 on the same head. Steps 2-3 may be repeated for any additional microactuators of the same head. Once all microactuators for a head have been calibrated, step 4 may be performed to calibrate microactuators for any additional heads or actuator arms. A proposed method for the calibration operation is described in regard to FIG. 6.

Figure 6:
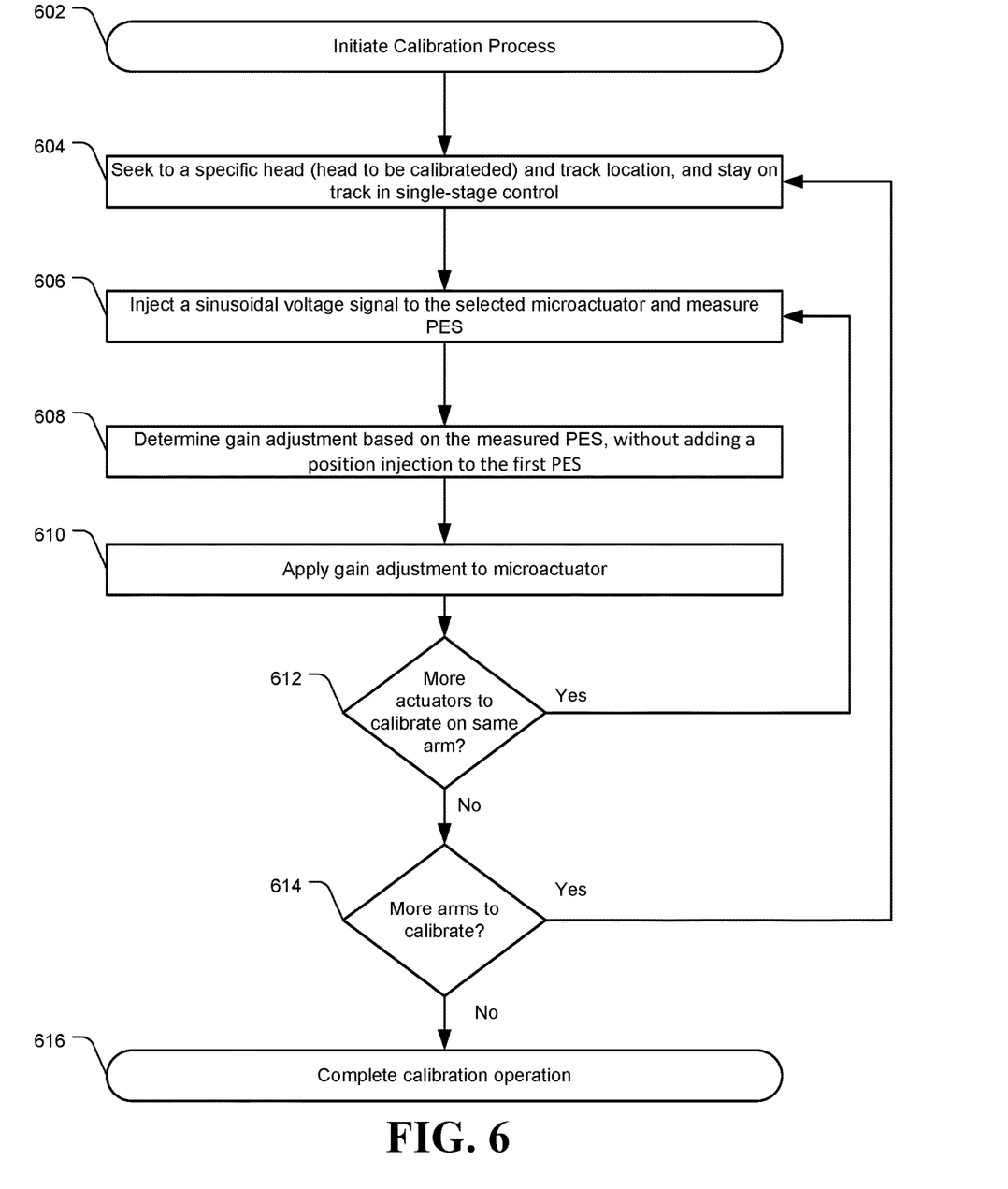
FIG. 6 depicts a flowchart of an example method for calibration of a multi-stage servo system, in accordance with certain embodiments of the present disclosure.

FIG. 6 depicts a flowchart of an example method 600 for calibration of a multi-stage servo system, in accordance with certain embodiments of the present disclosure. Method 600 may be performed by a data storage device, for example DSD 100 using an actuator calibration module (ACM) 230. Method 600 may include an example process for calibrating actuators in a multi-stage servo system, such as PZT microactuators on an actuator arm of a disc data storage device, although the implementations are not limited thereto. The method 600 may be for a performing a gain-based actuator calibration operation, and not a phase-based calibration operation.

The method 600 may include initiating a calibration process or operation, at 602. The calibration may be implemented on a system with a digital controller $C_v$ configured such that the gain of the single-stage sensitivity at a selected frequency $f_0$ is one, or equal to 0 decibels: $S_{SS}(f_0)=1$ (=0 dB).

At 604, the method 600 may include selecting a head or actuator arm to be calibrated, seeking the selected head to a target track location, and perform track following of the target track using single-stage control. Single stage control may include staying on track using a first actuator, which may be a largest or most coarse-positioning actuator in the multi-stage system, such as a voice coil motor (VCM) actuator of a data storage device.

Once the selected head is following the target track, the method 600 may include selecting a microactuator to calibrate, and injecting a sinusoidal voltage signal to the selected microactuator, at 606. The injected signal may cause the microactuator to actuate, adjusting a position of the head relative to the target track. The positioning signals read from the target track may be passed back along the servo system loop and compared to a desired or reference position signal (e.g. a signal that would be received if the head were perfectly centered over the target track). A difference between the read position signal (representing the head's actual location) and the reference signal may be used to generate and measure a position error signal (PES).

Based on the measured PES, the method 600 may include determining a gain adjustment for the selected microactuator, at 608. The gain adjustment may be determined based on the single sinusoidal voltage signal injection to the selected microactuator, and may not be based on any second injection into the servo system, such as injecting a position signal to the first PES, and determining a ratio of the PES of the first voltage injection to a PES of the second injection.

Once the gain adjustment has been determined, the method 600 may include calibrating the selected microactuator by applying the determined gain adjustment, at 610. A determination may be made whether there are more actuators to calibration for the currently selected arm or head, at 612. If yes, the method 600 may include selecting the next actuator, and repeating the method from 606.

If there are no additional actuators to calibrate on the currently selected head or arm, at 612, the method 600 may include determining if there are any other arms or heads having actuators to calibrate, at 614. For example, some disc data storage mediums may include a plurality of actuator arms and corresponding heads, so that data can be written to or retrieved from multiple disc media simultaneously. If there are additional arms or heads to calibrate, the method 600 may include selecting the new head and repeating the method from 604. If there are no additional arms or heads to calibrate, the calibration operation may complete, at 616. The method 600 depicted in FIG. 6 is merely exemplary, and variations may be made without departing from the scope of the disclosure. For example, a calibration operation can be initiated and completed for a single head or arm, or for a single actuator, without calibrating multiple actuators per arm or multiple arms.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Steps depicted in the flowcharts may optionally be excluded, added, performed in a different order, or performed with different degrees of concurrency than shown (e.g. steps depicted as sequential may be performed concurrently). Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. A method comprising:
   performing a calibration process on a first arm of a multi-stage actuated servo system, wherein the multi-stage actuated servo system includes multiple arms, each arm having multiple microactuators; wherein the calibration process is repeated for a second arm;
   the calibration process including:
   seeking the first arm of the multi-stage actuated servo system to a selected location, via a first stage actuator;
   providing a first voltage injection to a first microactuator of the multi-stage actuated servo system;
   measuring a first position error signal (PES) of the multi-stage actuated servo system;
   determining a first gain for the first microactuator based on the first PES, without adding a signal injection to the first PES; and
   applying the first gain to the first microactuator.

2. The method of claim 1 further comprising:
   providing a second voltage injection to a second microactuator of the multi-stage actuated servo system;
   measuring a second position error signal (PES) of the multi-stage actuated servo system;
   determining a second gain for the second microactuator based on the second PES, without adding a signal injection to the second PES; and
   applying the second gain to the second microactuator.

3. The method of claim 1 further comprising:
   the first microactuator comprises a piezoelectric actuator on a transducer arm of a disc data storage device; and
   the first stage actuator comprises a voice coil motor of the transducer arm.

4. The method of claim 3 further comprising:
   the first microactuator configured to adjust a position of a suspension of the transducer arm; and
   the second microactuator located between the suspension and a head coupled to the suspension, and configured to adjust a position of the head.

5. The method of claim 4 further comprising:
   measuring the first position error signal (PES) based on a head position contribution of the first stage actuator combined with a head position contribution of the first microactuator.

6. The method of claim 5 further comprising:
   the first voltage injection includes a sequence having a selected voltage with a predetermined and normalized injection level.

7. An apparatus comprising:
   a first actuator arm and a second actuator arm, each having a multi-stage actuated servo system, each actuator arm including, respectively:
   a first actuator;
   a second actuator;
   a control circuit configured to perform a calibration process on the multi-stage actuated servo system of an arm; including:
   seek the multi-stage actuated servo system to a selected location, via a first stage actuator;
   provide a first voltage injection to the second actuator;
   measure a first position error signal (PES) of the actuator arm;
   determine a first gain for the second actuator based on the first PES, without adding a signal injection to the first PES; and
   apply the first gain to the second actuator;
   wherein the control circuit is configured to:
   perform the calibration process for the first actuator arm; and
   repeat the calibration process for the second actuator arm.

8. The apparatus of claim 7 further comprising:
   the first actuator includes a voice coil motor; and
   the second actuator includes a piezoelectric microactuator.

9. The apparatus of claim 8 further comprising:
a disc drive, including:
    a disc data storage medium;
    the first and second actuator arms;
    the control circuit, including a servo control circuit; and
    a data storage control circuit.

10. The apparatus of claim 9 further comprising:
the disc drive further including:
a stack of multiple disc data storage mediums, including the disc data storage medium;
a plurality of actuator arms including the first and second actuator arms, each of the plurality of actuator arms including a plurality of microactuators, the plurality of actuator arms including an actuator arm for each surface of the stack of multiple disc data storage mediums configured for storing data.

11. The apparatus of claim 7 further comprising:
the actuator arm including a third actuator;
the calibration process further including:
    provide a second voltage injection to the third actuator;
    measure a second position error signal (PES) of the actuator arm;
    determine a second gain for the third actuator based on the second PES, without adding a signal injection to the second PES; and
    apply the second gain to the third actuator.

12. The apparatus of claim 11 further comprising:
the second actuator configured to adjust a position of a suspension of the actuator arm; and
the third actuator located between the suspension and a head coupled to the suspension, and configured to adjust a position of the head.

13. The apparatus of claim 7 comprising the calibration process further including:
measure the first PES based on a head position contribution of the first actuator combined with a head position contribution of the second actuator.

14. The apparatus of claim 7 further comprising:
the first voltage injection includes a sequence having a selected voltage with a predetermined and normalized injection level.

15. A memory device storing instructions that, when executed, cause a processor to perform a method for a calibration process on a first arm of a multi-stage actuated servo system, wherein the multi-stage actuated servo system includes multiple arms, each arm having multiple microactuators; wherein the calibration process is repeated for a second arm;
the calibration process including:
    seeking the first arm of the multi-stage actuated servo system to a selected location, via a first stage actuator;
    providing a first voltage injection to a first microactuator of the multi-stage actuated servo system;
    measuring a first position error signal (PES) of the multi-stage actuated servo system;
    determining a first gain for the first microactuator based on the first PES, without adding a signal injection to the first PES; and
    applying the first gain to the first microactuator.

16. The memory device of claim 15 storing instructions that, when executed cause the processor to perform the method further comprising:
executing the calibration processor further includes calibrating multiple microactuators on a microactuator arm, including:
    providing a second voltage injection to the second microactuator;
    measuring a second position error signal (PES) of the multi-stage actuated servo system;
    determining a second gain for the second microactuator based on the second PES, without adding a signal injection to the second PES; and
    applying the second gain to the second microactuator.

17. The memory device of claim 15 storing instructions that, when executed cause the processor to perform the method further comprising:
the first stage actuator comprises a voice coil motor of a transducer arm of a disc data storage device;
the first microactuator comprises a piezoelectric actuator on the transducer arm, the first microactuator configured to adjust a position of a suspension of the transducer arm; and
the calibration process further includes calibrating a second microactuator using a same process as calibrating the first microactuator, the second microactuator located between the suspension and a head coupled to the suspension, and configured to adjust a position of the head.

18. The memory device of claim 15 storing instructions that, when executed cause the processor to perform the method further comprising:
measuring the first position error signal (PES) based on a head position contribution of the first stage actuator combined with a head position contribution of the first microactuator.

19. The memory device of claim 15, further comprising:
the first voltage injection includes a sequence having a selected voltage with a predetermined and normalized injection level.

* * * * *